United States Patent
Hock

(10) Patent No.: US 9,753,183 B2
(45) Date of Patent: Sep. 5, 2017

(54) AIRCRAFT EXPENDABLE INSTRUMENT LAUNCH DETECTOR SYSTEM

(71) Applicant: University Corporation for Atmospheric Research, Boulder, CO (US)

(72) Inventor: Terrence Hock, Arvada, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 304 days.

(21) Appl. No.: 14/636,686

(22) Filed: Mar. 3, 2015

(65) Prior Publication Data
US 2017/0023703 A1    Jan. 26, 2017

(51) Int. Cl.
*G01W 1/08* (2006.01)
*G01D 5/14* (2006.01)

(52) U.S. Cl.
CPC .............. *G01W 1/08* (2013.01); *G01D 5/145* (2013.01)

(58) Field of Classification Search
CPC ................................ G01D 5/142; G01W 1/08
See application file for complete search history.

(56) References Cited

U.S. PATENT DOCUMENTS

| 4,112,753 A * | 9/1978 | Call ........................ G01W 1/08 340/870.1 |
| 5,339,288 A * | 8/1994 | Blier ........................ G01V 1/38 181/116 |
| 8,939,056 B1 * | 1/2015 | Neal, III ................. F42B 15/22 102/387 |
| 9,035,475 B1 * | 5/2015 | Cunningham .......... F03D 9/002 102/208 |
| 2014/0076043 A1 * | 3/2014 | Bognar .................... G01W 1/08 73/170.28 |
| 2014/0142788 A1 * | 5/2014 | Denton .................... G01W 1/00 701/3 |
| 2014/0224009 A1 * | 8/2014 | Brown .................... G01W 1/08 73/170.28 |

\* cited by examiner

*Primary Examiner* — Francis Gray
(74) *Attorney, Agent, or Firm* — The Ollila Law Group LLC

(57) ABSTRACT

An aircraft expendable instrument, an apparatus for launching an aircraft expendable instrument, and a method for detecting the launch of an aircraft expendable instrument are provided. The aircraft expendable instrument launch system an aircraft expendable instrument, a launch tube, a magnetic field generator positioned in the launch tube, a magnetic field detector positioned in the aircraft expendable instrument, and an electronics electrically coupled to the magnetic field detector. The electronics operable to detect a signal provided by the magnetic field detector when the aircraft expendable instrument an air travels through a magnetic field generated by the magnetic field generator.

22 Claims, 3 Drawing Sheets

AIRCRAFT EXPENDABLE INSTRUMENT LAUNCH DETECTOR SYSTEM

GOVERNMENT LICENSE RIGHTS

The U.S. Government has a paid-up license in this invention and the right in limited circumstances to require the patent owner to license others on reasonable terms as provided for by the terms of Agreement No. M0856145, awarded by a National Science Foundation and National Center for Atmospheric Research cooperative agreement.

TECHNICAL FIELD

The present Application is directed towards aircraft expendable instrument systems, and more particularly, to an aircraft expendable instrument launch detector system.

BACKGROUND OF THE INVENTION

In the atmospheric sciences, many types of aircraft expendable instruments are ejected from altitude to provide in situ measurements. For example, aircraft expendable instruments may include: dropsondes, Airborne eXpendable BathyThermographs (AXBT), Airborne eXpendable Current Profilers (AXCP), Airborne eXpendable Conductivity Temperature and Depth probes (AXCTD), and drifting buoys, in addition to others. Aircraft expendable instruments may be launched or ejected from an aircraft using a launch tube. A launch tube offers a passage from the inside of a cabin or internal structure of an aircraft to the outside environment.

A "dropsonde," also known as a dropwindsonde or a sonde, is an example aircraft expendable instrument. A dropsonde is a weather instrument that takes measurements as it descends through the atmosphere to the surface of the Earth. A dropsonde may include a radio transmitter, pressure, humidity, and temperature sensors, a microprocessor, a battery, and a parachute, in addition to other components. A dropsonde continuously measures atmospheric properties such as temperature, humidity, and wind profiles as it descends to the surface, transmitting those measurements back to the launching aircraft via radio waves. Dropsondes provide a detailed profile of atmospheric properties that is of great value for weather prediction and climate research.

Detecting precisely when a dropsonde is launched from the aircraft can be very important part of operating the dropsonde device to produce high quality atmospheric measurements. For example, it can be important to accurately time critical operations after launch, such as when to activate release of the parachute that will be used to slow the descent of the dropsonde, and when to modify the RF power level of the dropsonde transmitter after launch. Moreover, a precise launch time may be needed to provide accurate data products using the dropsonde scientific instruments.

Prior aircraft expendable instrument launch systems fail to determine a precise launch time. In the example of dropsonde launch detection systems, designs rely on integrated launch detection and parachute release functions. When the dropsonde is launched from an aircraft, the parachute is initially packed under a parachute cap secured to the dropsonde housing with a ribbon wrapped around the dropsonde body holding on a parachute cap. Before deployment, the parachute blocks light from reaching a Cadmium Sulphide (CdS) photo detector positioned in the parachute compartment from either the sun or from an LED installed within the parachute compartment. After launch and parachute deployment however, light provided from either the sun or an LED may reach the photo detector to signal that the launch has occurred.

The prior launch technology is problematic because it requires the success of a series steps in order for launch detect to work correctly. For example, the steps required to launch a dropsonde include: 1) the unwinding of the ribbon wrapped around the outside of the dropsonde body immediately after launch, 2) the release of the parachute cap from the dropsonde tube body, 3) the ejection of the parachute from its compartment, and 4) the detection of light by the CdS detector after parachute release. Even if all of the steps execute properly, performance of several dropsonde components must perform within strict limits or the dropsonde launch may not be properly detected. Possible complications include variable CdS detector sensitivity and variable dropsonde tube opacity to sunlight. In addition, if the parachute is not properly packed in its compartment, blocking all light to the CdS detector prior to launch, the CdS detector will fail to detect the launch of the dropsonde.

What is needed is an aircraft expendable instrument launch detection system that is simpler, requires fewer steps, fewer parts, provides increased reliability, and is capable of providing a precise launch time.

SUMMARY OF THE INVENTION

An aircraft expendable instrument is provided according to an embodiment of the Application. The aircraft expendable instrument includes a magnetic field detector positioned in the aircraft expendable instrument electronics. The electronics is electrically coupled to the magnetic field detector, and operable to detect a signal provided by the magnetic field detector upon detection of a magnetic field.

An aircraft expendable instrument launch system is provided according to an embodiment of the Application. The aircraft expendable instrument launch system includes an aircraft expendable instrument, a launch tube, a magnetic field generator, a magnetic field detector, and an electronics. The magnetic field generator is positioned in the aircraft launch tube. The magnetic field detector is positioned in the aircraft expendable instrument. The electronics is electrically coupled to the magnetic field detector, and to detect a signal provided by the magnetic field detector upon detection of the magnetic field.

A method for detecting the launch of an aircraft expendable instrument is provided according to an embodiment of the Application. The method includes the steps of generating a magnetic field in a launch tube with a magnetic field generator, positioning a magnetic field detector in an aircraft expendable instrument, inserting the aircraft expendable instrument in the launch tube above the magnetic field, launching the aircraft expendable instrument via the launch tube, and detecting the magnetic field using an electronics electrically coupled to the magnetic field detector. The electronics is operable to detect a signal provided by the magnetic field detector upon detection of the magnetic field.

A method of manufacturing an aircraft expendable instrument launch detection system is provided according to an embodiment of the Application. The method includes the steps of positioning a magnetic field detector inside the aircraft expendable instrument and positioning an electronics inside the aircraft expendable instrument. The electronics are electrically coupled to the magnetic field detector and operable to detect a signal provided by the magnetic field detector upon detection of a magnetic field in a launch tube.

DETAILED DESCRIPTION OF THE INVENTION

Figure 1:
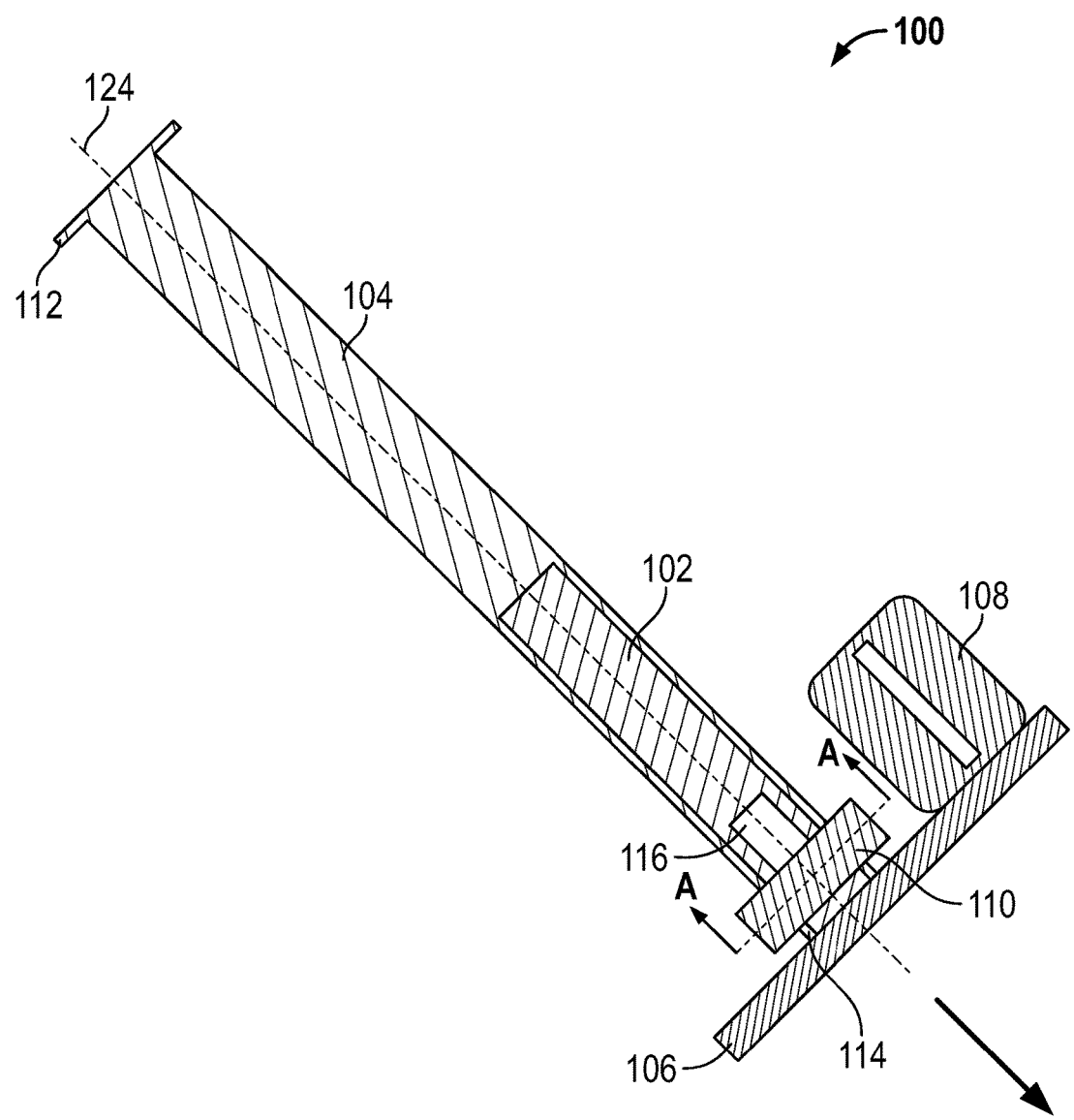
FIG. 1 depicts aircraft expendable instrument launch system 100, in accordance with an embodiment.
Figure 2:
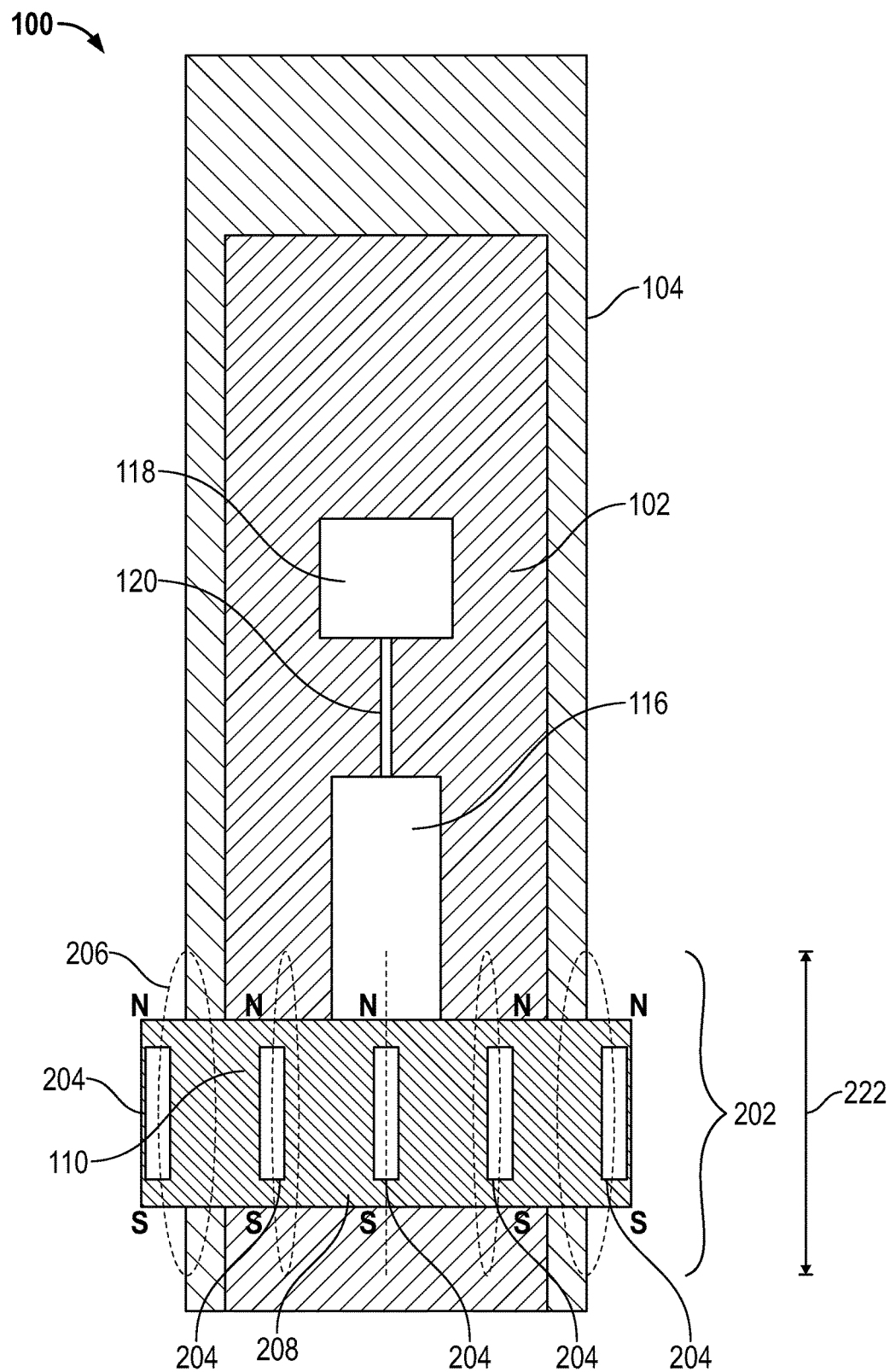
FIG. 2 depicts aircraft expendable instrument launch system 100, in accordance with an embodiment.
Figure 3:
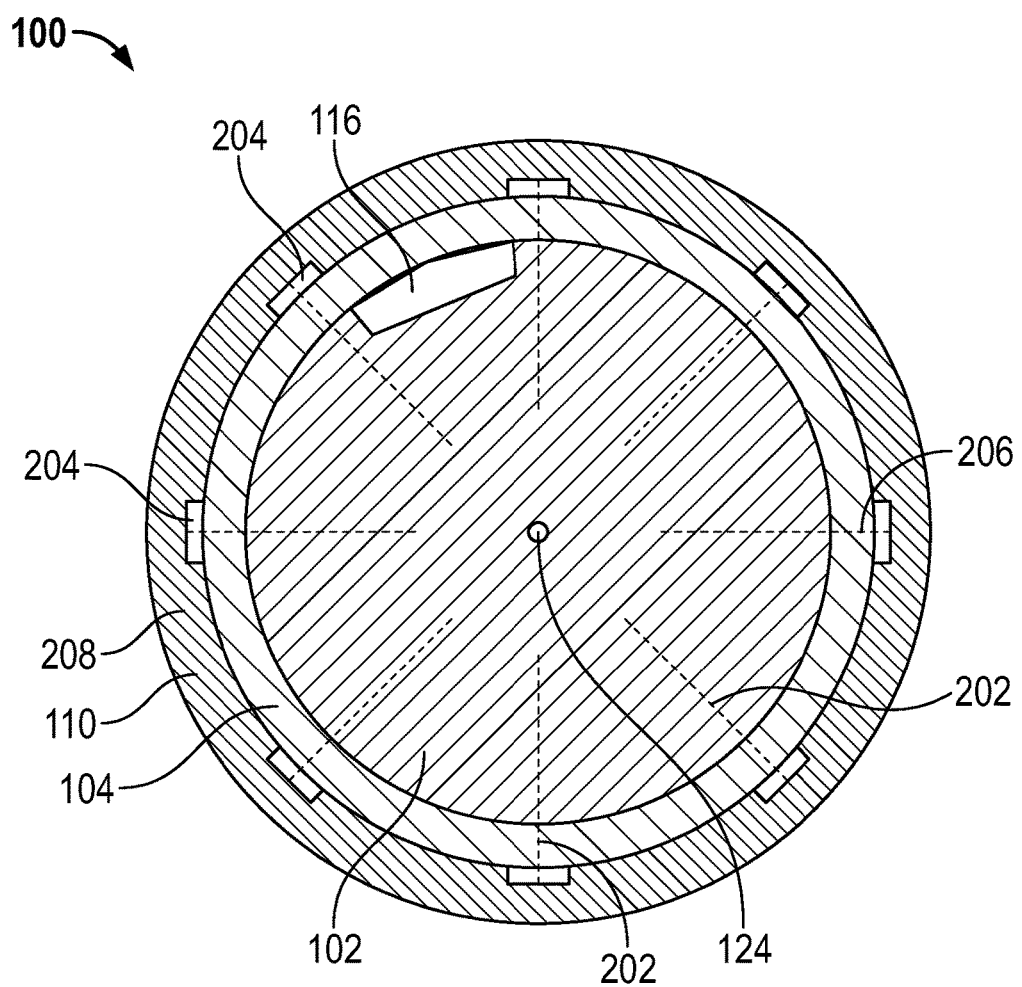
FIG. 3 depicts aircraft expendable instrument launch system 100, in accordance with an embodiment.

FIGS. 1-3 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below can be combined in various ways to form multiple variations of the Application. As a result, the Application is not limited to the specific examples described below, but only by the claims and their equivalents.

FIG. 1 depicts an aircraft expendable instrument launch system 100, in accordance with an embodiment. Launch system 100 is configured to launch an aircraft expendable instrument from the interior to the exterior of an aircraft. FIGS. 1-3 depict launch system 100 in preparation to launch a dropsonde 102. This is not intended to be limiting, however; those of skill in the art will understand that any aircraft expendable instrument may be substituted for the dropsonde 102 discussed in the description below.

Launch system 100 is positioned inside an aircraft, where it may be accessible to a human operator. Launch system 100 includes a launch tube 104, a substantially hollow, cylindrical body with a central axis 124. Launch tube 104 includes an insertion end 112 and an ejection end 114. Ejection end 114 is adjacent to a gate valve 106 that opens to the exterior of the aircraft, allowing dropsonde 102 to pass into the outside environment. In embodiments, gate valve 106 may be operated by a gate valve motor 108. In further embodiments, gate valve 106 may be manually operated.

An operator may place dropsonde 102 inside launch tube 104 via insertion end 112, and dropsonde 102 may come to rest against a closed gate valve 106, as depicted in FIG. 1. When gate valve 106 is opened, dropsonde 102 may be launched out of the aircraft in the direction indicated by the arrow in FIG. 1. Once outside, dropsonde 102 may deploy a parachute and commence nominal science operations.

Launch system 100 includes a magnetic field generator 110. Magnetic field generator 110 is operable to create a magnetic field 202 inside launch tube 104. FIG. 2 depicts a detail of aircraft expendable instrument launch system 100, and FIG. 3 depicts a cross-section of aircraft expendable instrument launch system 100 represented by the line marked AA in FIG. 1. In the example embodiment provided, it may be seen that, magnetic field generator 110 is incorporated into a sleeve 208. Advantageously, sleeve 208 may be coupled to any part of launch tube 104. In embodiments, magnetic field generator 110 may be coupled to the outside of launch tube 104. This may allow prior launch tube assemblies to be retrofitted with the launch detection technology embodied in the present Application.

In embodiments, magnetic field generator 110 may be permanently integrated into launch tube 104, generating a magnetic field 202 that may be detected by dropsonde 102 inside launch tube 104. For example, as may be seen in FIG. 3, magnetic field generator 110 may include eight permanent magnets 204 mounted equidistant around sleeve 208. Turning back to FIG. 2, it may be seen that each of the eight permanent magnets 204 include co-aligned north and south poles. A single example magnetic flux line 206 is represented in FIGS. 2 and 3 for each permanent magnet 204. As flux lines 206 that make up magnetic field 202 depict, the eight permanent magnets 204 may generate a static, uniform magnetic field 202 inside launch tube 104 that is symmetric about axis 124. Magnetic field 202 may have a magnetic field height 222 oriented parallel to axis 124. In an example embodiment, magnetic field height 222 may include a section that is at least 1 centimeters long, along which a magnetic flux density is at least 50 gauss.

Although magnetic field generator 110 represented in FIGS. 2 and 3 includes eight permanent magnets, this is not intended to be limiting. In embodiments, magnetic field generator 110 may include any number of permanent magnets in any orientation capable of producing a detectable uniform magnetic field inside dropsonde 102. Alternatively, magnetic field generator 110 may include an electromagnetic coil, or any other type of magnet known to those of skill in the art.

Advantageously, the creation of a well-defined, uniform, symmetric magnetic field 202 inside launch tube 104 may allow aircraft expendable instrument launch system 100 to detect dropsonde 102 in any rotational orientation within launch tube 104.

FIGS. 2 and 3 depict magnetic field detector 116 positioned above magnetic field 202. When dropsonde 102 is loaded into launch tube 104, magnetic field detector 116 is positioned above magnetic field 202 to avoid false triggering before launch. Magnetic field detector 116 is operable to produce a signal when magnetic field 202 is detected. Magnetic field detector 116 may provide a signal as dropsonde 102 passes quickly through launch tube 104, indicating that dropsonde 102 has launched.

In embodiments, magnetic field detector 116 may include a fast-response magnetic sensor, such as a Hall Effect device. In further embodiments, magnetic field detector 116 may include a reed switch, a solid state magnetic switch, or any other type of magnetic sensor commonly known to those of skill in the art. Magnetic field detector 116 may be oriented so that the magnetic sensor element is orthogonal to magnetic flux lines 206, thereby enabling the detection of magnetic field 202.

As dropsonde 102 is loaded into insertion end 112 of launch tube 104, and at all times prior to launch, magnetic field detector 116 must be separated from magnetic field 202 to avoid false triggering of magnetic field detector 116; magnetic field detector 116 must only detect magnetic field 202 as dropsonde 102 launches. Therefore, in embodiments magnetic field generator 110 may be positioned proximate to ejection end 114 of launch tube 104. Magnetic field detector 116 may be further positioned inside dropsonde 102 to remain above magnetic field 202 as dropsonde 102 rests against gate valve 106, thereby preventing the triggering magnetic field detector 116 prior to launch.

As may be seen in FIG. 2, dropsonde 102 further includes electronics 118. Electronics 118 may perform many critical operations for dropsonde 102. For example, electronics 118 may perform data acquisition via the pressure, humidity, and temperature sensors included in dropsonde 102. Electronics 118 may also process GPS information, receive commands, collect and transmit telemetry. Electronics 118 may include any type of computer, microprocessor, or embedded electronics system commonly known to those of skill in the art. Electronics 118 may incorporate further sensors and mechanisms, as required for various applications.

Electronics 118 may be electrically coupled to magnetic field detector 116 via connection 120. Electronics 118 is operable to detect the signal produced by magnetic field detector 116 when dropsonde 102 travels through the magnetic field generated by the magnetic field generator 110. In embodiments, electronics 118 may identify a launch time when electronics 118 detects the signal provided by magnetic field detector 116. Electronics 118 may transmit telemetry including the launch time, or perform dropsonde operations based upon elapsed time after the launch time.

The ejection speed of dropsonde 102 through a typical launch tube may reach speeds of up to 80 m/s. Magnetic field detector 116 and electronics 118 must be capable of detecting magnetic field 202 as dropsonde 102 is in motion. Therefore, in embodiments where magnetic field height 222 is at least 1 cm, electronics 118 may include a sample rate that is 8 KHz or higher to allow electronics 118 to detect magnetic field 202.

Advantageously, using a solid state electronic approach to detecting the launch of a dropsonde eliminates the need for several mechanical actions to occur correctly. This invention uses fewer parts than current technology and can increase the reliability of launch detect while lowering dropsonde manufacturing costs. Moreover, the solid state electronic solution described in the present Application it is simple to apply to existing launch tubes because it only requires the addition of a magnetic ring.

The detailed descriptions of the above embodiments are not exhaustive descriptions of all embodiments contemplated by the inventors to be within the scope of the Application. Indeed, persons skilled in the art will recognize that certain elements of the above-described embodiments may variously be combined or eliminated to create further embodiments, and such further embodiments fall within the scope and teachings of the Application. It will also be apparent to those of ordinary skill in the art that the above-described embodiments may be combined in whole or in part to create additional embodiments within the scope and teachings of the Application.

I claim:

1. An aircraft expendable instrument, comprising:
   a magnetic field detector positioned in the aircraft expendable instrument; and
   an electronics electrically coupled to the magnetic field detector, the electronics operable to detect a signal provided by the magnetic field detector upon detection of a magnetic field.

2. The aircraft expendable instrument of claim 1, wherein the aircraft expendable instrument is a dropsonde.

3. The aircraft expendable instrument of claim 1, wherein the magnetic field detector is a Hall Effect detector.

4. The aircraft expendable instrument of claim 1, wherein the electronics is operable to identify a launch time when the electronics detects the signal provided by the magnetic field detector.

5. An aircraft expendable instrument launch system, comprising:
   an aircraft expendable instrument;
   a launch tube;
   a magnetic field generator positioned in the launch tube;
   a magnetic field detector positioned in the aircraft expendable instrument; and
   an electronics electrically coupled to the magnetic field detector, the electronics operable to detect a signal provided by the magnetic field detector upon detection of the magnetic field.

6. The aircraft expendable instrument launch system of claim 5, wherein the magnetic field is symmetric around an axis of the launch tube.

7. The aircraft expendable instrument launch system of claim 5, wherein the magnetic field generator is positioned below the magnetic field detector until launch.

8. The aircraft expendable instrument launch system of claim 5, wherein the magnetic field generator includes a ring of permanent magnets positioned around the launch tube.

9. The aircraft expendable instrument launch system of claim 5, wherein the magnetic field includes magnetic field lines that are oriented parallel to an axis of the launch tube.

10. The aircraft expendable instrument launch system of claim 9, wherein the magnetic field has a magnetic flux density that is at least 50 gauss over at least a 1 centimeter magnetic field height.

11. The aircraft expendable instrument launch system of claim 5, wherein the magnetic field detector is a Hall Effect detector.

12. The aircraft expendable instrument launch system of claim 5, wherein the electronics is operable to identify a launch time when the electronics detects the signal provided by the magnetic field detector.

13. A method for detecting the launch of an aircraft expendable instrument using a magnetic field detector positioned in the aircraft expendable instrument, the method comprising the steps of:
   generating a magnetic field in a launch tube with a magnetic field generator;
   inserting the aircraft expendable instrument in the launch tube above the magnetic field;
   launching the aircraft expendable instrument via the launch tube; and
   detecting the magnetic field using an electronics electrically coupled to the magnetic field detector, the electronics operable to detect a signal provided by the magnetic field detector upon detection of the magnetic field.

14. The method of claim 13, wherein the magnetic field is symmetric around an axis of the launch tube.

15. The method of claim 13, wherein the magnetic field generator includes a ring of permanent magnets positioned around the launch tube.

16. The method of claim 13, wherein the magnetic field includes magnetic field lines oriented parallel to an axis of the launch tube.

17. The method of claim 13, wherein the magnetic field has a magnetic flux density that is at least 50 gauss over at least a 1 centimeter magnetic field height.

18. The method of claim 13, the magnetic field detector is a Hall Effect detector.

19. The method of claim 13, wherein inserting the aircraft expendable instrument in the launch tube above the magnetic field includes separating the magnetic field detector from the magnetic field prior to launching the aircraft expendable instrument via the launch tube.

20. The method of claim 13, further comprising the step of:
   designating a launch time when the electronics detects the signal provided by the magnetic field detector.

21. A method of manufacturing an aircraft expendable instrument launch detection system, the method including the steps of:
 positioning a magnetic field detector inside the aircraft expendable instrument;
 positioning an electronics inside the aircraft expendable instrument, the electronics electrically coupled to the magnetic field detector and operable to detect a signal provided by the magnetic field detector upon detection of a magnetic field in a launch tube.

22. The method of claim 21, wherein the aircraft expendable instrument is a dropsonde.

* * * * *